United States Patent

[11] 3,582,124

| [72] | Inventor | Thomas J. Quirk, Jr.<br>18 & 19 Appleton St., Boston, Mass. 02116 |
|---|---|---|
| [21] | Appl. No. | 763,849 |
| [22] | Filed | Sept. 30, 1968 |
| [45] | Patented | June 1, 1971 |

[54] PORTABLE HANDLE, ESPECIALLY FOR USE IN PUBLIC TRANSPORTATION VEHICLE
1 Claim, 2 Drawing Figs.

[52] U.S. Cl. ............................................. 294/26,
105/354
[51] Int. Cl. ............................................. B65g 7/12
[50] Field of Search ...................................... 294/26, 19,
86 H, 86 CG, 87 SH; 105/354, 461

[56] References Cited
UNITED STATES PATENTS

| 584,133 | 6/1897 | McIntire........................ | 105/354 |
| 1,182,790 | 5/1916 | Piper............................. | 294/26 |

Primary Examiner—Harvey C. Hornsby
Assistant Examiner—Alfred N. Goodman
Attorney—Charles Hieken ABSTRACT: A portable handle has a hook at one end for attachment over a public transportation vehicle rail that is grasped diametrically opposite the bight in the hook by an element at the end of a shaft screwably supported in the hook element so that rotation of the handle allows the assembly to be tightened against or unloosened from the rail and provide the user with a convenient handle to grasp while standing in a public transportation vehicle.

PATENTED JUN 1 1971

3,582,124

INVENTOR.
THOMAS J. QUIRK, JR.
BY Wolf, Greenfield & Hicken
ATTORNEYS

PORTABLE HANDLE, ESPECIALLY FOR USE IN PUBLIC TRANSPORTATION VEHICLE

BACKGROUND OF THE INVENTION

The present invention relates in general to portable handles and more particularly concerns a novel portable handle especially useful for a short person who must stand in a public transportation vehicle or for any person standing in a public transportation vehicle so crowded that there is no unused handle or vertical rail to grasp.

It is an important object of this invention to provide a convenient portable handle for use by a person traveling in a public vehicle.

It is a further object of the invention to achieve the preceding object with a handle that is readily attachable and detachable to and from a variety of rails or handles in a public vehicle.

SUMMARY OF THE INVENTION

According to the invention, there is means defining a hook, means for detachably securing the hook to a rodlike element and extension means connecting a handle portion to the hook means.

Numerous other features, objects and advantages of the invention will become apparent from the following specification when read in connection with the accompanying drawing in which:

DETAILED DESCRIPTION OF PREFERRED EMBODIMENTS

Figures 1, 2:
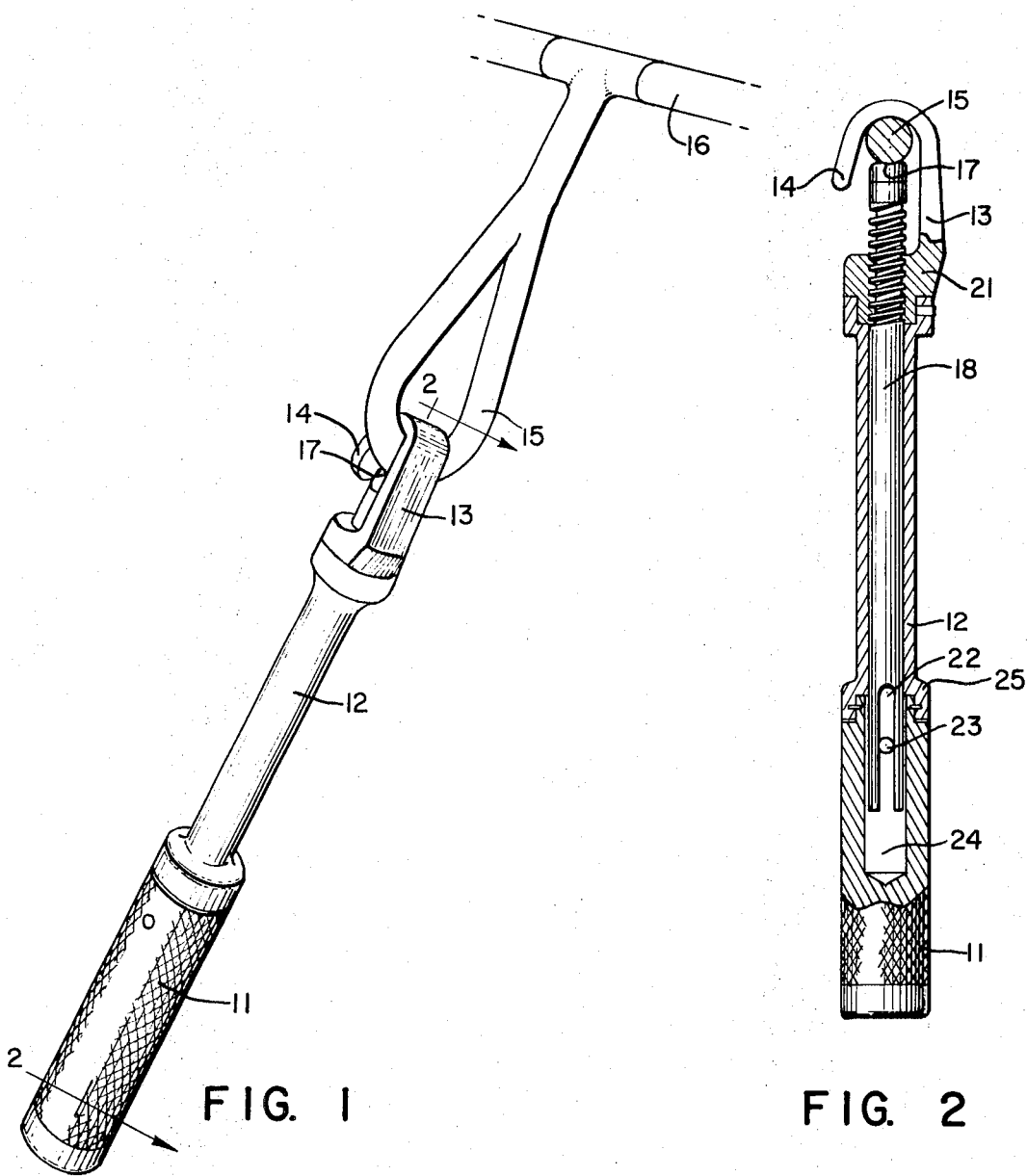
FIG. 1 is a perspective view of an embodiment according to the invention secured to a swinging public transportation vehicle handle.
FIG. 2 is a view through section 2–2 of FIG. 1.

With reference now to the drawing, FIG. 1 shows a perspective view of an embodiment of the invention attached to a public transportation vehicle swinging handle and FIG. 2 is a view through section 2–2 thereof. A short rider may grasp handle 11 coupled by hollow extension shaft 12 to end portion 13 having a hook 14 extending over swinging handle 15 of the public transportation vehicle which in turn is pivotal about the horizontal rail 16. The end 17 of an internal threaded shaft 18 screwably seated within the lower portion 21 of end portion 13 coacts with the bight of hook 14 to firmly attach the extension assembly according to the invention to the handle 15. Internal shaft 18 has a slot 22 at its lower end that rides over a stud 23 in the inside wall 24 of handle portion 11, handle portion 11 having a hollow recess to permit the lower end of internal shaft 18 to ride between a fully retracted and fully extended position. Handle 11 is rotatably secured to the lower end 25 of extension sleeve 12 by ball bearings or other suitable couplings. Rotation of handle 11 causes rotation of shaft 18 through the action of stud 23. The user may grasp shaft 12 in his left hand, rotate handle 11 counterclockwise until end 17 is retracted, attach hook 14 over a swinging handle 15, horizontal rail 16, a vertical rail in a public transportation vehicle or any other convenient attachment means in the public transportation vehicle. Then the user need only continue to grasp shaft 12 with his left hand while rotating handle 11 with his right hand clockwise until end 17 rests against the rail. Removal is equally easy to accomplish. The user grasps sleeve 12 with his left hand and rotates handle 11 counterclockwise. The hook is then removed from the element to which it was attached, and the user may conveniently store the handle in a briefcase, purse, shopping bag or conveniently carry it.

There has been described a novel portable handle especially useful for a short person required to stand in public transportation vehicles. Attachment and detachment is rapid and easy. When the handle is attached, the user has a secure grip.

It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What I claim is:

1. A portable handle for use in a public transportation vehicle comprising, means defining an end hook with a threaded opening for overlapping contacting relationship with a rodlike element in a public transportation vehicle, fastening means including said hook and threaded shaft means in said threaded opening relatively movable with respect to said hook for detachably securing said hook to said rodlike element, handle means, means for supporting said handle means while permitting rotation thereof about the axis of said shaft means, and means for coupling said handle means to said shaft means whereby said handle means functions both as a handle for support and when rotated for relatively positioning the end of said shaft means and said end hook in any of a continuum of stable positions between fully retracted and fully withdrawn positions as said threaded shaft rotates in said threaded opening for sandwiching said rodlike element between said hook and the end of said shaft means to comprise means for establishing said handle and said rodlike element in relatively stationary relationship.